United States Patent [19]

Dimick

[11] Patent Number: 5,941,332
[45] Date of Patent: Aug. 24, 1999

[54] MOTORIZED BICYCLE

[76] Inventor: Mark O. Dimick, 4553 Judson Way, La Mesa, Calif. 91941

[21] Appl. No.: 08/891,858

[22] Filed: Jul. 9, 1997

[51] Int. Cl.[6] .................................................. B62K 11/00
[52] U.S. Cl. ......................... 180/205; 180/206; 180/65.2
[58] Field of Search ............................ 280/259; 180/205, 180/206, 207, 230, 65.2, 65.6, 219, 218, 11

[56] References Cited

U.S. PATENT DOCUMENTS

| | | | |
|---|---|---|---|
| 700,151 | 5/1902 | Muzzy . | |
| 752,741 | 2/1904 | Wilkinson . | |
| 2,091,698 | 8/1937 | Anthony et al. | 180/33 |
| 2,770,311 | 11/1956 | Kreidler | 180/33 |
| 4,200,164 | 4/1980 | Pearne | 180/206 |
| 4,267,898 | 5/1981 | Wheaton | 180/205 |
| 4,301,885 | 11/1981 | Kostron | 180/205 |
| 4,393,954 | 7/1983 | Soucy et al. | 180/205 |
| 4,397,369 | 8/1983 | Read | 180/205 |
| 4,603,754 | 8/1986 | Matsutoh et al. | 180/221 |
| 5,076,386 | 12/1991 | Ferneding | 180/205 |
| 5,158,314 | 10/1992 | Farras Pinos | 280/259 |
| 5,242,028 | 9/1993 | Murphy et al. | 180/220 |
| 5,361,863 | 11/1994 | Goodwin | 180/205 |
| 5,829,543 | 11/1998 | Diaz | 180/181 |

FOREIGN PATENT DOCUMENTS

| | | | |
|---|---|---|---|
| 1074431 | 6/1967 | United Kingdom | 180/65.2 |

*Primary Examiner*—Lee W. Young
*Assistant Examiner*—Dan Yeagley
*Attorney, Agent, or Firm*—John L. Rogitz

[57] ABSTRACT

A motorized bicycle includes a gasoline powered trimmer motor that is mounted on the rear of the bicycle. The flexible drive cable of the trimmer motor is coupled to a first overrunning clutch by a vertically-oriented gear system that includes a worm and a worm gear. In turn, the first overrunning clutch is coupled via a chain and sprocket system to the conventional chain ring of the bicycle, and a second overrunning clutch is likewise coupled to the chain ring of the bicycle to couple the pedal shaft of the bicycle to the chain ring. Each overrunning clutch includes a central shaft having four pawls, and five reciprocating spring-loaded plungers surround the shaft and selectively engage the pawls every 18° of shaft rotation.

20 Claims, 5 Drawing Sheets

MOTORIZED BICYCLE

FIELD OF THE INVENTION

The present invention relates generally to motorized bicycles, and more particularly to bicycles that can be pedaled by a rider while also being powered by a motor.

BACKGROUND

Bicycle riding is an enjoyable mode of transportation, because riding a bicycle is environmentally benign and is also a pleasant and healthful exercise. Moreover, bicycling to work is less expensive than commuting by car. Not surprisingly, many people commute to and from work on bicycles.

As recognized herein, for daily bicycling to and from work, particularly at distances that exceed a few miles, it can be advantageous to provide a motorized assist to selectively aid a rider in propelling a bicycle. Likewise, a motorized assist to a bicycle rider can be helpful on long sojourns undertaken for exercise or vacation.

The present invention understands that bicycles which can be pedalled by a rider have been provided that can be propelled not only by pedal power, but alternatively by means of a motor that is mounted on the frame of the bicycle. An example of such an apparatus is the so-called "Moped", which can either be pedalled by a rider, or be propelled by a motor. Such devices, however, cannot be both pedalled and powered by a motor simultaneously. Indeed, so-called "Mopeds" essentially are motorcycles that can be pedalled only at low speeds, while the motor is disengaged from the drive assembly. When the motor is engaged with the drive assembly, the apparatus cannot be pedalled. Thus, the motors of so-called "Mopeds" replace pedalling altogether, and consequently "Mopeds" defeat the purpose of the present invention in providing a means to assist a rider in pedalling a bicycle over long distances.

Additionally, U.S. Pat. Nos. 5,361,863 and 5,242,028 disclose motorized bicycles that incorporate motors in propelling bicycles. Unfortunately, the devices disclosed in the '863 and '028 patents suffer from several drawbacks. These drawbacks include motors being mounted on the bicycle forward of the seat, thereby potentially impeding the leg action of a rider and undesirably shifting the centers of gravity of the bicycles forward from where the centers of gravity otherwise would be. Moreover, the clutch disclosed in the '028 patent would appear to be less robust than is required for prolonged use, and the '863 patent does not disclose in any detail the clutch that it is intended to incorporate.

Further, with particular regard to the '028 patent, the use of an electric motor is required, which in turn requires that a relatively heavy, cumbersome twelve volt battery be mounted on the bicycle. On the other hand, to couple the '863 motor with the drive shaft while achieving the necessary speed reduction, the '863 patent incorporates plural spur gears which consume space in the transverse dimension, thereby further potentially impeding the leg action of the rider. Additionally, the '863 patent teaches that its power transmission assembly requires that the motor be mounted with the crankshaft oriented transversely on the bicycle, which in turn requires that the conventional crankshaft be modified as taught by the '863 patent. As recognized by the present invention, it is preferable to avoid modifying the crankshaft of a conventional motor, because such modifications can be costly and time-consuming procedures.

As further recognized by the present invention, it is possible to provide a motorized bicycle that uses a light-weight gasoline motor without requiring modifications to the motor, and without impeding the leg action of a rider. Accordingly, it is an object of the present invention to provide a motorized bicycle that can be pedalled by a rider simultaneously with being powered by a motor that does not impede the rider's leg action. Another object of the present invention is to provide a motorized bicycle that uses a strong, reliable gear system that can directly interface with the existing derailleur system of a bicycle. Still another object of the present invention is to provide a motorized bicycle that incorporates strong, reliable clutches to permit the bicycle to be pedalled by a rider simultaneously with being powered by a motor. Yet another object of the present invention is to provide a motorized bicycle that is easy to use and cost-effective to manufacture.

SUMMARY OF THE INVENTION

A motorized bicycle is disclosed that includes a frame defining a front and a rear and having a seat support column. A seat is mounted on the seat support column, a chain ring is disposed below the seat, and opposed bicycle pedals are provided on a pedal shaft. In accordance with the present invention, the bicycle includes a gasoline motor that is mounted on the frame behind the seat. The motor has a flexible drive cable extending along the seat support column. A reduction gear assembly is coupled to the flexible drive cable, and a first overrunning clutch is coupled to the reduction gear assembly. In turn, a power sprocket is coupled to the first overrunning clutch, with a power chain being meshed with the power sprocket. A second overrunning clutch couples the pedal shaft to the chain ring, with an input sprocket being coupled to the chain ring and meshed with the power chain. With this cooperation of structure, the chain ring is caused to rotate by engaging the motor, by pedalling the pedals, and by engaging the motor and pedalling the pedals simultaneously to thereby propel the bicycle.

In a preferred embodiment, the motor includes a crankshaft, and the motor is mounted on the bicycle with the crankshaft oriented in a longitudinal dimension relative to the frame. Furthermore, the frame preferably includes at least one rear mounting ferrule, and the motor includes a bell housing having at least a first motor fastener depending downwardly toward the ferrule. A motor mount includes at least one tube insert that is engaged with the fastener, and at least one vertically-oriented support tube closely receives the insert in the top of the tube. At least one frame adaptor is engaged with the bottom segment of the tube and with the ferrule to thereby support the motor on the frame.

Additionally, the bell housing includes a top drive cable clamp and a bottom drive cable clamp, with the flexible drive cable being held securely between the clamps. Plural metal clamp bolts having respective shanks extend through the clamps, and plural metal clamp nuts are engaged with a respective clamp bolt to thereby hold the flexible drive cable securely between the clamps.

To reduce the rotational speed imparted by the drive cable and to change the axis of rotation imparted by the drive cable, the reduction gear assembly includes plural vertically-oriented rotatable shafts. At least one of the shafts is an input shaft connected to the flexible drive cable of the motor. The input shaft includes an input gear. Also, at least one of the shafts is a worm shaft including a worm element coupled to the input gear. A worm gear is meshed with the worm element, and a wormgear shaft is attached to the worm gear and is gearedly coupled to the first overrunning clutch.

With respect to propelling the bicycle using pedal power, the pedal shaft establishes plural pawls, and the second overrunning clutch includes a plunger block surrounding the pedal shaft. Plural plungers are disposed in the plunger block for reciprocable motion in a radial dimension relative to the pedal shaft, with each plunger being spring biased toward the pedal shaft for ratchetably engaging the pawls of the pedal shaft.

In another aspect, an apparatus is disclosed for coupling a gasoline powered motor to a chain ring of a bicycle having pedals and a pedal shaft. The apparatus includes a motor that is mountable on the bicycle. Per the present invention, the motor has a crankshaft and a drive cable. A reduction gear assembly is coupled to the drive cable, and the reduction gear assembly includes a worm element meshed with a worm gear for translating rotational motion about a first axis to rotational motion about a second axis. The second axis is not parallel to the first axis, such that the motor can be mounted on the bicycle with the crankshaft oriented in a longitudinal dimension relative to the bicycle. A first overrunning clutch is coupled to the worm gear of the reduction gear assembly, with the first overrunning clutch also being couplable to the chain ring to propel the bicycle.

In yet another aspect, a bicycle includes a seat mounted on a frame, pedals attached to a pedal shaft, and a chain ring. A gasoline motor is mounted behind the seat, and the motor has a flexible drive cable extending forward toward the pedal shaft. Per the present invention, a clutch assembly interconnects the drive cable of the motor, the pedal shaft, and the chain ring such that the chain ring is caused to rotate by engaging the motor, by pedalling the pedals, and by engaging the motor and pedalling the pedals simultaneously to thereby propel the bicycle.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
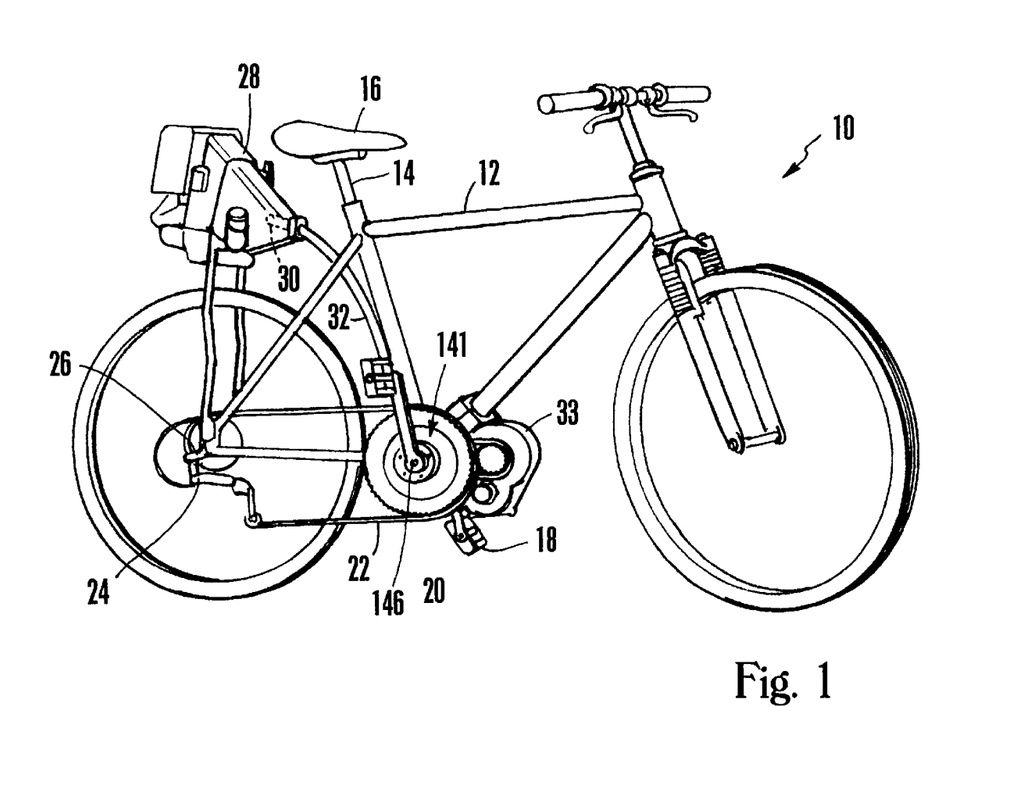
FIG. 1 is a perspective view of the motorized bicycle of the present invention.

Referring initially to FIG. 1, a bicycle, generally designated 10, is shown that includes a frame 12 having a seat support column 14 and a seat 16 mounted on the seat support column 14. Also, the bicycle 10 includes two opposed pedals 18 that are mounted on opposite ends of a pedal shaft (described further below in reference to FIG. 6) and that can be pedalled by a rider to turn a chain ring 20. In turn, the chain ring 20 is meshed with a bicycle chain 22 that extends rearwardly relative to the bicycle 10 to a rear derailleur system 24. Near the rear derailleur system 24, the frame 12 includes one or more, preferably two, attachment ferrules 26 for engaging rear cargo holders and/or other peripheral bicycle components. As the skilled artisan will recognize, the components disclosed thus far are conventional bicycle components that are incorporated in, e.g., multi-gear mountain bicycles.

As further shown in FIG. 1, a gasoline motor 28 is mounted on the frame 12 behind the seat 16. In the preferred embodiment, the motor 28 is a grass trimmer motor that includes a crankshaft 30 (shown in phantom in FIG. 1) and a flexible drive cable 32. Owing to the gearing disclosed below, the motor 28 is mounted on the frame 12 with the crankshaft 30 and the drive cable 32 both oriented parallel to the longitudinal dimension defined by the bicycle 10, without undesirably requiring modifications to the crankshaft 30.

Now referring to FIGS. 1 and 2, the drive cable 32 of the motor 28 extends forwardly and downwardly, along the seat support column 14, to a metal gear box 33, the details of which will be disclosed further below. The front portion of the motor 28 is supported on the frame 12 by means of the drive cable 32, and the rear portion of the motor 28 is supported on the frame 12 by means of a dual-tube mount. In the specific embodiment best shown in FIG. 2, the motor 28 includes a bell housing, generally designated 34, that has two motor bolts 36 depending downwardly therefrom. Internally threaded ring-like metal tube inserts 38 are threadably engaged with respective bolts 36. Furthermore, each tube insert 38 is press fit and roll-pinned into the top segment of a respective vertically oriented hollow rigid metal support tube 40. In turn, a bottom segment of each support tube 40 is welded to a respective hollow metal generally semi-cylindrical ferrule adaptor 42 that is configured to mate with a respective one of the ferrules 26 (FIG. 1). Adaptor bolts 44 affix the adapters 42 to their respective ferrules 26 to thereby support the motor 28 on the frame 12.

In contrast to the two rear motor supports 40 disclosed above, a single front support is established by the flexible drive cable 32. In the preferred embodiment, to provide adequate strength and shock tolerance during operation, the motor's bell housing 34 is modified from its conventional configuration to include a hollow rigid hard plastic or metal top drive cable clamp 46 that is formed with a semi-circular opening 46a. Also, the bell housing 34 includes a bottom drive cable clamp 48 that is the mirror image of the top clamp 46 and that accordingly is formed with a semi-circular opening 48a that is opposed to the opening 46a in the top clamp 46. As can be appreciated in reference to FIG. 2, the flexible drive cable 32 is held securely between the clamps 46, 48. To hold the clamps 46, 48 together, two metal clamp bolts 50 having respective shanks that extend through the clamps 46, 48 are engaged with respective metal clamp nuts 52, each of which clamp nut 52 is formed separately from the clamps 46, 48 to more securely engage the bolts 50 than a plastic boss in the clamp 48 otherwise would.

Figure 2:
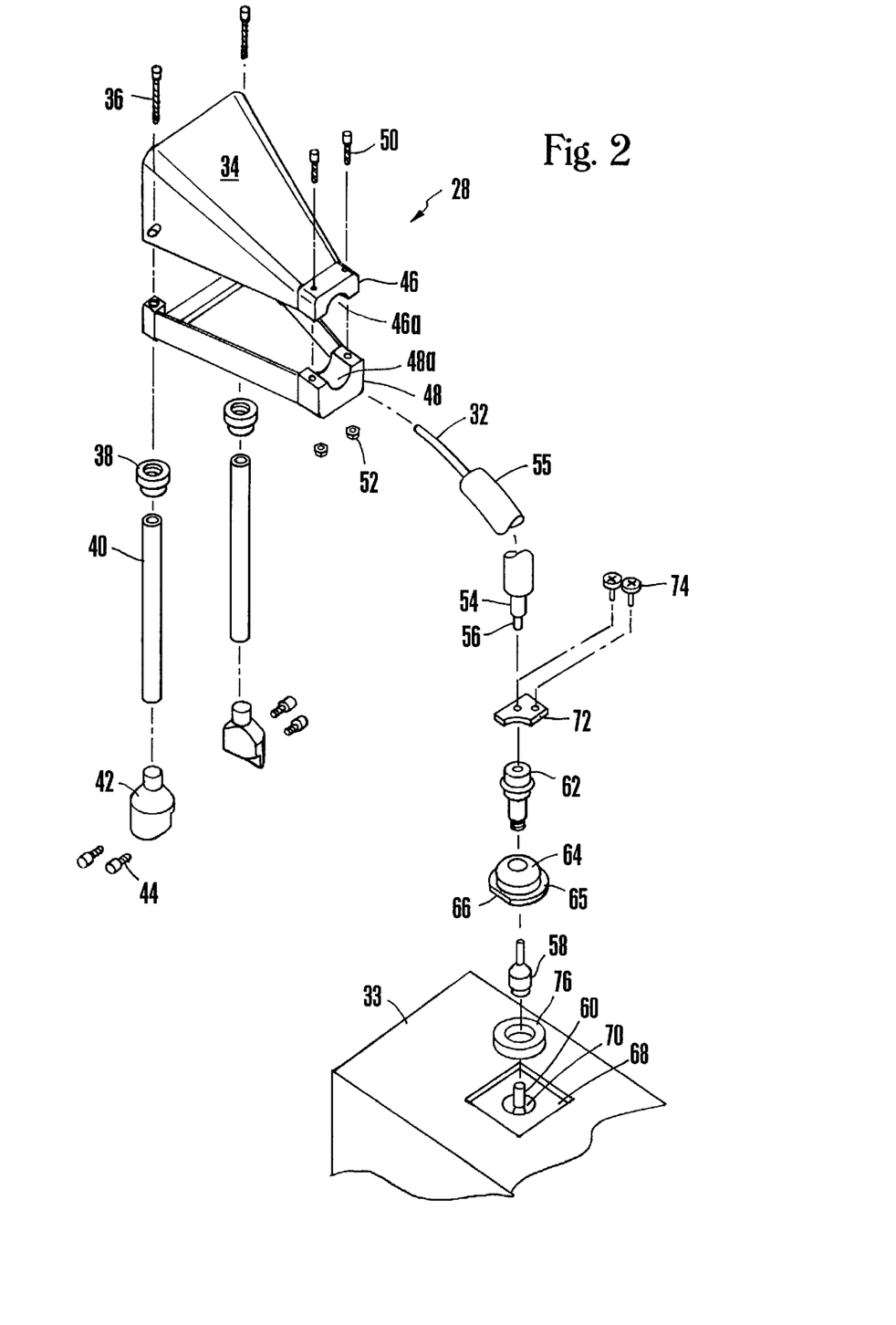
FIG. 2 is an exploded perspective view of the trimmer and trimmer mount assembly.

As shown in FIG. 2, the drive cable 32 is covered by a hollow flexible plastic sleeve 54 that is encased in a metal sheath 55. At its end 56, the drive cable 32 is connected to a rigid metal fitting 58. It is to be understood that the fitting 58 is formed with a parallelepiped-shaped channel. Consequently, the fitting 58 can closely receive a parallelepiped-shaped spline 60 of an input shaft in the gear box 33 as shown and described below.

FIG. 2 shows the preferred means by which the drive cable 32 is secured to the gear box 33. A rigid hollow metal tube adaptor 62 surroundingly engages the sleeve 54 of the drive cable 32, with the drive cable 32 protruding through the adaptor 62. The tube adaptor 62 is threadably engaged with a hollow dome-shaped metal box adaptor 64 formed with a bottom flange 65 having a straight edge 66. FIG. 2 shows that the box adaptor 64 is positioned in a shallow rectangular recess 68 of the gear box 33, with the straight edge 66 of the box adaptor 64 positioned against one of the straight sides of the recess 68 to thereby prevent rotation of the box adaptor 64. The spline 60, as shown, extends upwardly through a hole 70 that is centrally formed in the recess 68. A clamp 72 is configured for flushly mating with the flange 65 of the box adaptor 64, and fasteners 74 extend through the clamp 72 and are threadably engaged with the gear box 33 to hold the clamp 72 and, thus, the box adaptor 64, against the gear box 33. If desired, a lower ring-shaped cable roller bearing 76 is positioned inside the box adaptor 64 with the fitting 58 extending through the annulus of the bearing 76, to radially support the drive cable 32.

Figure 3:
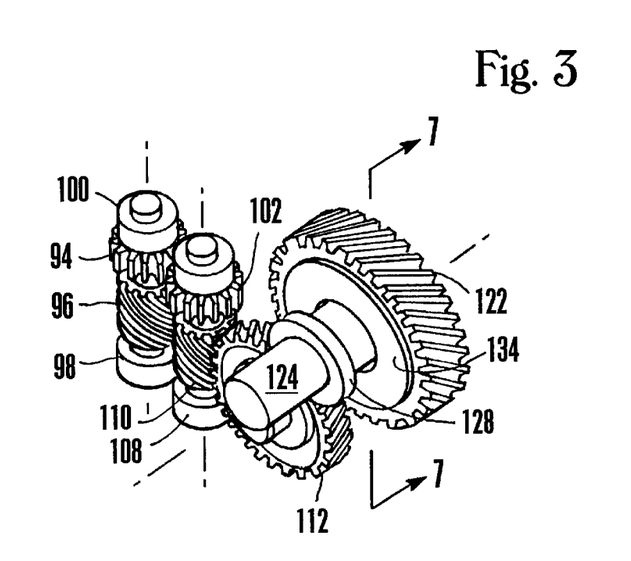
FIG. 3 is a perspective view of the vertical and transverse transmission shafts.
Figure 4:
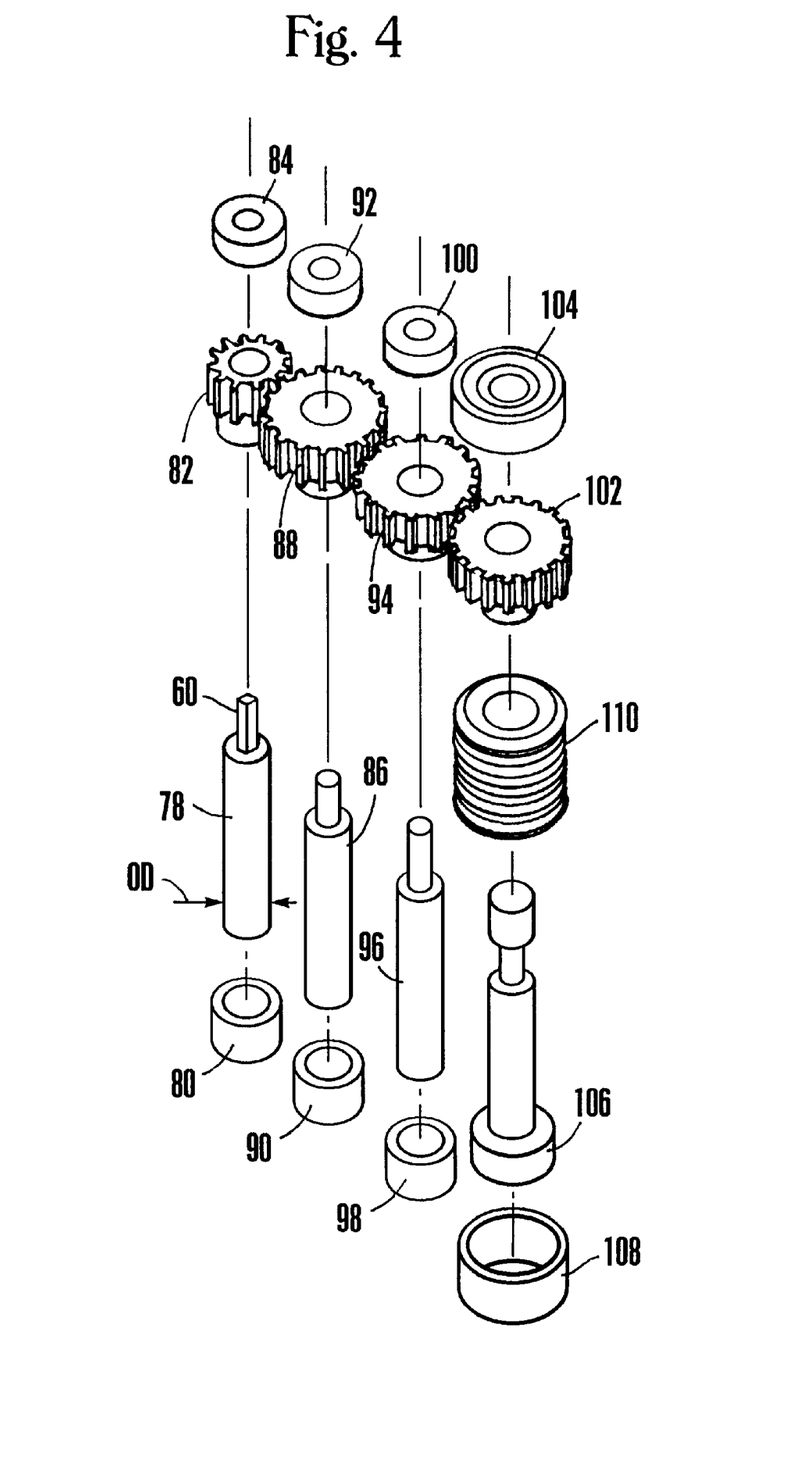
FIG. 4 is an exploded perspective view of the vertical shafts shown in FIG. 3, including the worm element.

In cross-reference to FIGS. 3 and 4, the reduction gear assembly of the present invention can be seen. In accordance with the present invention, the reduction gear assembly not only reduces the speed of rotation imparted by the drive cable 32, but it changes the axis of rotation as described below, to permit the motor 28 to be mounted on the bicycle 10 with the crankshaft 30 and drive cable 32 of the motor 28 oriented longitudinally, without requiring modification to the crankshaft 30.

In the specific embodiment best shown in FIG. 4, the spline 60 is formed on an upper segment of a vertically-oriented input shaft 78 that is rotatably mounted in the gear box 33. Preferably, the outer diameter "OD" of the input shaft 78, like the diameters of the other three vertical shafts shown in FIG. 4, is relatively large. This ensures that a hydrodynamic film is established between the input shaft 78 and a plain metal bushing 80 that radially supports the input shaft 78 in the gear box 33, it being understood that the gear box 33 is formed with an oil sump in which the input shaft 78 rotates. As recognized by the present invention, the use of vertically-oriented shafts with enlarged diameters, in conjunction with an oil film, permits the use of relatively inexpensive lower bearing bushings, and thus eliminates the need for relatively more expensive roller bearings to support the lower ends of the vertical shafts.

An hollow input shaft spur gear 82 is coaxially received on the input shaft 78 and is pinned thereto, such that the input shaft spur gear 82 rotates when the input shaft 78 rotates. Also, a ring-like upper roller bearing 84 is coaxially received on the input shaft 78 to support the upper segment of the shaft 78.

A first vertical idler shaft 86 includes a first idler spur gear 88 that is meshed with the input gear 82. Like the input shaft 78, the first idler shaft 86 includes a lower bushing 90 and an upper roller bearing 92.

FIG. 4 shows that the first idler gear 88 is in turn meshed with a second idler spur gear 94 on a second vertical idler shaft 96 having a lower bushing 98 and an upper roller bearing 100. A wormshaft spur gear 102 that is pinned to a vertical wormshaft 104 meshes with the second idler gear 94. The wormshaft 104 is formed with a radially enlarged lower bearing surface 106 that is supported by a ring-shaped lower bushing 108. Also, an upper wormshaft roller bearing 109 radially supports the upper segment of the wormshaft 104. In one preferred embodiment, the upper wormshaft roller bearing 109 is a type 7200B roller bearing made by Consolidated.

In accordance with the present invention, as shown in FIGS. 3 and 4 a multiple thread worm element 110 is keyed to the wormshaft 104 such that the worm element 110 rotates with the wormshaft 104. As shown best in FIG. 3, the worm element 110 is meshed with a worm gear 112, to thereby translate the axis of rotation from the vertical axis to the horizontal axis defined by the worm gear 112.

Figure 5:
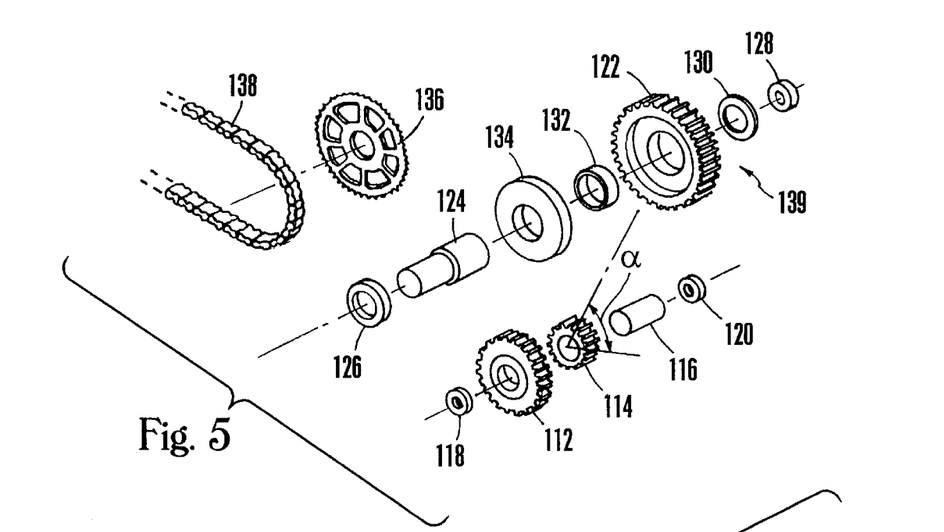
FIG. 5 is an exploded perspective view of the wormgear shaft that engages the worm element shown in FIG. 4, showing the motor sprocket and motor sprocket chain.

Now cross-referencing FIGS. 3 and 5, the worm gear 112 is coaxially disposed relative to a spur pinion 114, and both the worm gear 112 and spur pinion 114 are fixed to a worm gear shaft 116. Thus, as the worm element 110 causes the worm gear 112 to turn, the worm gear shaft 116 turns and the spur pinion 114 turns with it.

As shown best in FIG. 5, the worm gear 112 is sandwiched between two worm gear shaft roller bearings 118, 120, on the worm gear shaft 116. As stated above, it is to be understood that the spur pinion 114, worm gear 112, and worm gear shaft 116 turn together. In one preferred embodiment, the reduction gear assembly of the present invention establishes an overall 80:1 gear ratio.

Still referring to FIGS. 3 and 5, the spur pinion 114 is meshed with a driven spur gear 122 that is received coaxially on, but not affixed to, an output shaft 124. A gear ratio of about 3:1 is established between the spur pinion 114 and the driven spur gear 122. As shown best in FIG. 5, the spur pinion 114 is meshed with the driven spur gear 122 such that the output shaft 124 is angled with respect to the worm gear shaft 116. In the preferred embodiment, the output shaft 124 establishes an angle α of about sixty degrees (60°) with respect to the worm gear shaft 116.

First and second output shaft roller bearings 126, 128 are coaxially received by the output shaft 124 to support the shaft 124 in the gear box 33. A ring-shaped gear retainer 130 is sandwiched between the driven spur gear 122 and the second output shaft roller bearing 128 as shown. Also, a spur gear bushing 132 is press fit into the driven spur gear 122.

FIGS. 3 and 5 show that in the present invention, a motor clutch housing 134 is coaxially received on the output shaft 124 between the driven spur gear 122 and the first output shaft roller bearing 126. The clutch housing 134 is fixed to the driven spur gear 122, such that rotation of the driven spur gear 122 causes rotation of the clutch housing 134. Per the present invention, as more fully disclosed below the clutch housing 134 encloses a first overrunning clutch (139) that couples the driven spur gear 122 to the output shaft 124, it now being understood that the output shaft 124 is the output shaft of the first overrunning clutch enclosed by the clutch housing 134. Also, a power sprocket 136 is coaxially received on the output shaft 124 and is keyed thereto, and a power chain 138 is meshed with the power sprocket 136. Thus, as the output shaft 124 rotates, the power sprocket 136 rotates. Stated differently, the power sprocket 136 is coupled to the first overrunning clutch of the present invention by the output shaft 124.

Figure 6:
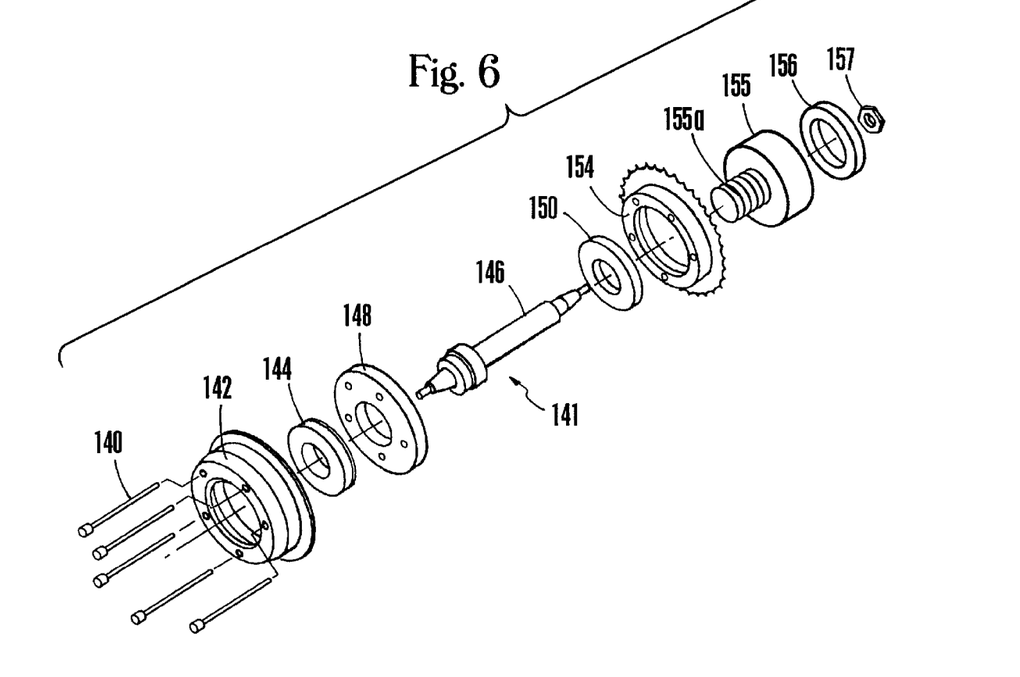
FIG. 6 is an exploded perspective view of the pedal shaft, showing the input sprocket that is engaged via the motor sprocket chain to the motor sprocket shown in FIG. 5.

Having described how power is transmitted from the motor 28 to the power sprocket 136, it will now be described how power is transmitted from the power sprocket 136 and from the pedals 18, to the chain ring 20. Referring now to FIGS. 1 and 6, five shoulder bolts 140 (FIG. 6) locate and hold together the components of a second overrunning clutch, generally designated 141 in FIGS. 1 and 6, on the pedal shaft of the bicycle 10 as described below. More specifically, the shoulder bolts 140 include respective shanks that extend through a chain ring housing 142. It is to be understood that the chain ring 20 shown in FIG. 1 is bolted to the chain ring housing 142, and that the chain ring 20 is coaxial with the chain ring housing 142. Thus, as the chain ring housing 142 rotates, the chain ring 20 rotates.

Seated within the chain ring housing 142 is a first pedal clutch roller bearing 144, which radially supports the chain ring housing 142 on an elongated solid metal ¾ inch OD pedal shaft 146. As mentioned above, the pedals 18 shown in FIG. 1 are mounted on opposite ends of the pedal shaft 146 by means well-known in the art.

Additionally, like the chain ring housing 142 and the first pedal clutch roller bearing 144, a clutch plunger block 148 is coaxially disposed around the pedal shaft 146, and the clutch plunger block 148 is sandwiched between the first pedal clutch roller bearing 144 and a second pedal clutch roller bearing 150. An engine power input sprocket 152 is radially supported by the second pedal clutch roller bearing 150 and is coaxial with the pedal shaft 146. It is to be understood that the engine power input sprocket 152 is meshed with the power chain 138 shown in FIG. 5, opposite the power sprocket 136. Thus, the engine power input sprocket 152 is coupled to the power sprocket 136 shown in FIG. 5 and, hence, to the motor 28.

In accordance with the present invention, the shanks of the bolts 140 extend through the chain ring housing 142 and clutch plunger block 148 and are threaded into a tap face 154 of the engine power input sprocket 152, to thereby hold the second overrunning clutch together. Thus, the second overrunning clutch is enclosed in the clutch plunger block 148, in the chain ring housing 142. It is to be understood that when assembled, the second overrunning clutch 141, including the chain ring housing 142 and bolted-on engine power input sprocket 152, is located on one side of the pedal shaft 146.

To support the pedal shaft 146 of the second overrunning clutch 141 on the frame of the bicycle 10, left and right identical hollow cup-shaped bearing collars (only the right bearing collar 155 shown) have respective externally threaded hollow tube portions (only tube portion 155a shown) that are threaded into respective frame fittings that exist on most conventional bicycle frames, it being understood that the pedal shaft 146 is received coaxially in the bearing collars 155. Respective 60-series ¾ inch ID collar roller bearings (only the right collar roller bearing 156 shown) are seated within their respective bearing collars 155 to radially and axially support the pedal shaft 146. It is to be understood that the pedal shaft 146 supports a respective pedal 18 on each end of the shaft 146. A nut 157 is threaded onto the pedal shaft 146 to retain the collar roller bearing 156 in the bearing collar 155.

With the above disclosure in mind, it may now be appreciated that the first overrunning clutch couples the reduction gear system that is associated with the motor 28 to the power sprocket 136. It may be further appreciated that the power sprocket 136 is coupled to the engine power input sprocket 152, which in turn is affixed to the chain ring 20 by the bolts 140 and the chain ring housing 142, to thereby provide a means for rotating the chain ring 20 (and, thus, propelling the bicycle 10) using the motor 28. It may now still further be appreciated that the pedal shaft 146 is also coupled to the chain ring 20 via the second overrunning clutch, to provide a means for rotating the chain ring 20 by pedalling the bicycle 10, in lieu of using the motor 28 or indeed simultaneously with the motor 28.

In other words, when the motor 28 is used to rotate the chain ring 20, the bicycle 10 is propelled whether the rider pedals or not; when the rider pedals, pedalling the pedal shaft 146 at an angular velocity that is faster than the angular velocity of the engine power input sprocket 152 will augment the propulsion of the bicycle 10. From another aspect, the motor 28 provides a partial or complete torque assist to the rider of the bicycle 10, the degree of the torque assist being determined by the relationship between motor 28 speed and pedal shaft 146 angular velocity.

Figure 7:
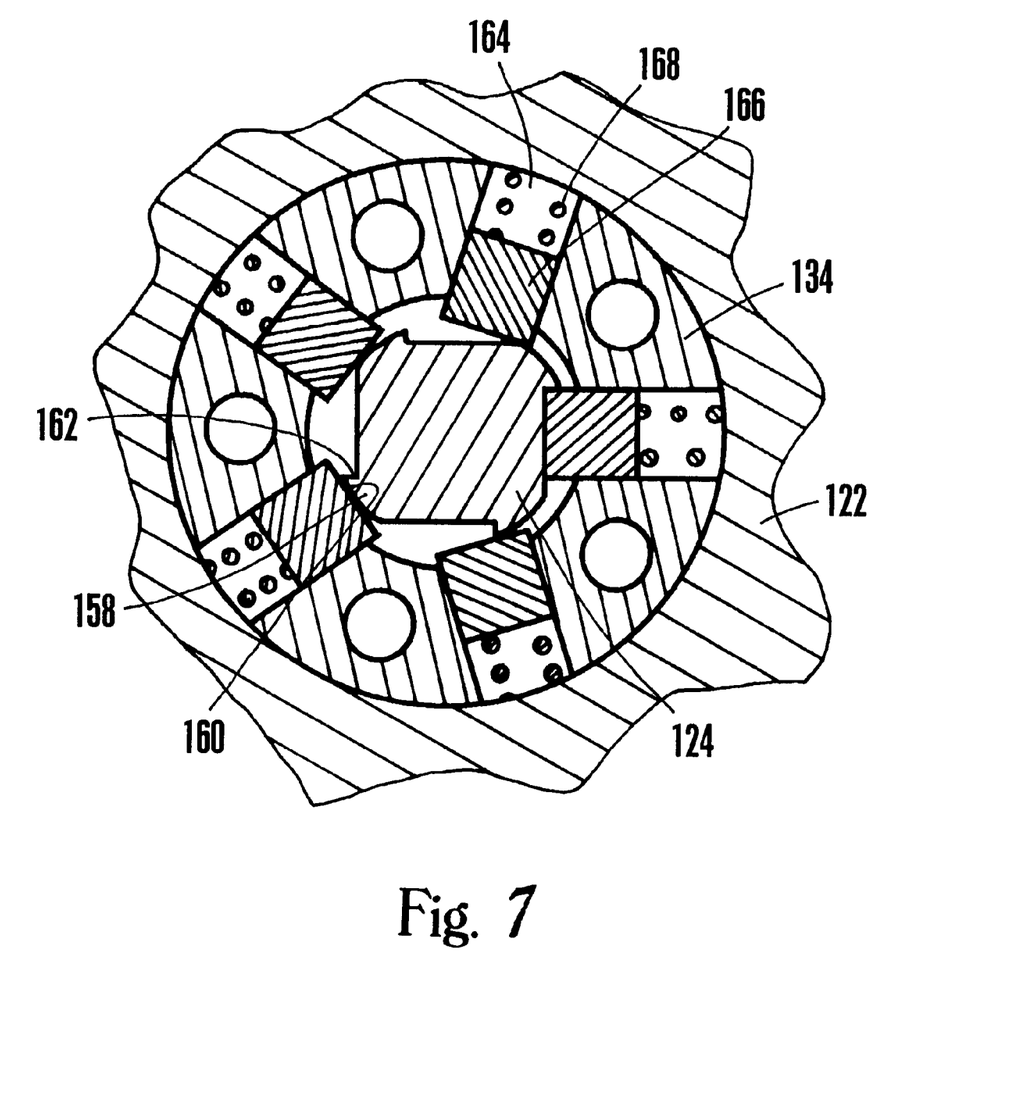
FIG. 7 is a cross-sectional view of one of the overrunning clutches of the present invention, as seen along the line 7—7 in FIG. 3.

The overrunning clutches of the present invention can be understood in reference to FIG. 7, which shows the first overrunning clutch including the output shaft 124, the plunger clutch housing 134, and the driven spur gear 122 previously discussed in relation to FIG. 5. It is to be understood that in the second overrunning clutch of the present invention, the above three components are respectively analogized by the pedal shaft 146, clutch plunger block 148, and chain ring housing 142 shown in FIG. 6, with the configuration and operation of the clutch plunger block 148 being in all essential respects identical to the configuration and operation of the plunger clutch housing 134. Accordingly, for clarity of disclosure, only the first overrunning clutch will be described in detail in FIG. 7.

As shown, the output shaft 124 is formed with four radial pawls 158, with each pawl 158 defining a respective sloped face 160 and a respective abutment face 162. Preferably, the output shaft 124 is carborized steel. A plurality of, preferably five, plunger cavities 164 are formed in the plunger clutch housing 134, and each cavity 164 is oriented along a radius of the housing 134 as shown.

FIG. 7 also shows that a respective rigid metal plunger 166 is reciprocally disposed in each plunger cavity 164. Moreover, a respective spring 168 is disposed in compression in each cavity 164 between the driven spur gear 122 and the respective plunger 166, to thereby bias the plungers 166 radially inwardly against the output shaft 124.

Accordingly, when the output shaft 124 rotates counterclockwise relative to the plunger clutch housing 134, the plungers 166 ride on the sloped surfaces 160 of the pawls 158 and, thus, rotate freely past the output shaft 124. On the other hand, when the output shaft 124 rotates clockwise relative to the plunger clutch housing 134, the plungers 166 are trapped by the abutment surfaces 162 of the pawls 158. Under these circumstances, the skilled artisan will appreciate that the output shaft 124 is engaged with the plunger clutch housing 134. Thus, the plungers 166 are ratchetably engaged with the pawls 158 of the output shaft 124. It is to be further appreciated that the use of five plungers 166 and four pawls 158 permits the clutch to be potentially engaged every 18° of shaft rotation.

While the particular MOTORIZED BICYCLE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A motorized bicycle including a frame defining a front and a rear and having a seat support column, a seat mounted on the seat support column, a chain ring below the seat, and opposed bicycle pedals on a pedal shaft, comprising:

a gasoline motor mounted on the frame behind the seat, the motor having a flexible drive cable extending along the seat support column;

a reduction gear assembly coupled to the flexible drive cable;

a first overrunning clutch coupled to the reduction gear assembly;

a power sprocket coupled to the first overrunning clutch;

a power chain meshed with the power sprocket;

a second overrunning clutch coupling the pedal shaft to the chain ring; and an input sprocket coupled to the chain ring, the input sprocket being meshed with the power chain, whereby the chain ring is caused to rotate by engaging the motor, by pedalling the pedals, and by engaging the motor and pedalling the pedals simultaneously to thereby propel the bicycle.

2. The bicycle of claim 1, wherein the motor includes a crankshaft, and the motor is mounted on the bicycle with the crankshaft oriented in a longitudinal dimension relative to the frame.

3. The bicycle of claim 1, wherein the frame includes at least one rear mounting ferrule and the motor includes a bell housing having at least a first motor fastener depending downwardly, and the bicycle further comprises a mount for holding the motor onto the frame, the mount including:

at least one tube insert engaged with the fastener;

at least one vertically-oriented support tube defining a top segment, the tube insert being closely received in the top segment, the support tube also defining a bottom segment; and at least one frame adaptor engaged with the bottom segment and with the ferrule to thereby support the motor on the frame.

4. The bicycle of claim 3, wherein the bell housing includes:

a top drive cable clamp;

a bottom drive cable clamp, the flexible drive cable being held securely between the clamps;

plural metal clamp bolts having respective shanks extending through the clamps; and plural metal clamp nuts, each clamp nut being formed separately from the clamps, each clamp nut being engaged with a respective clamp bolt to thereby hold the flexible drive cable securely between the clamps.

5. The bicycle of claim 1, wherein the reduction gear assembly includes:

plural vertically-oriented rotatable shafts, at least one of the shafts being an input shaft connected to the flexible drive cable of the motor and including an input gear, at least one of the shafts being a worm shaft including a worm element coupled to the input gear;

a worm gear meshed with the worm element; and a wormgear shaft attached to the worm gear and gearedly coupled to the first overrunning clutch.

6. The bicycle of claim 1, wherein the pedal shaft establishes plural pawls, and the second overrunning clutch includes:

a plunger block surrounding the pedal shaft; and plural plungers disposed in the plunger block for reciprocable motion in a radial dimension relative to the pedal shaft, each plunger being spring biased toward the pedal shaft for ratchetably engaging the pawls of the pedal shaft.

7. An apparatus for coupling a gasoline powered motor to a chain ring of a bicycle having pedals and a pedal shaft, comprising:

a motor mountable on the bicycle, the motor having a crankshaft and a drive cable;

a reduction gear assembly coupled to the drive cable, the reduction gear assembly including a worm element meshed with a worm gear for translating rotational motion about a first axis to rotational motion about a second axis, the second axis not being parallel to the first axis, such that the motor can be mounted on the bicycle with the crankshaft oriented in a longitudinal dimension relative to the bicycle; and a first overrunning clutch coupled to the worm gear of the reduction gear assembly, the first overrunning clutch also being couplable to the chain ring to propel the bicycle.

8. The apparatus of claim 7, further comprising:

a power sprocket coupled to the first overrunning clutch;

a power chain meshed with the power sprocket;

a second overrunning clutch configured for coupling the pedal shaft to the chain ring; and an input sprocket coupled to the chain ring, the input sprocket being meshed with the power chain, whereby the chain ring is caused to rotate by engaging the motor, by pedalling the pedals, and by engaging the motor and pedalling the pedals simultaneously to thereby propel the bicycle.

9. The apparatus of claim 8, wherein the bicycle includes a frame, the frame includes at least one rear mounting ferrule, and the motor includes a bell housing having at least a first motor fastener depending downwardly, and the apparatus further comprises:

at least one tube insert engaged with the fastener;

at least one vertically-oriented support tube defining a top segment, the tube insert being closely received in the top segment, the support tube also defining a bottom segment; and at least one frame adaptor engaged with the bottom segment and engageable with the ferrule to thereby support the motor on the frame.

10. The apparatus of claim 9, wherein the bell housing includes:

a top drive cable clamp;

a bottom drive cable clamp, the drive cable being held securely between the clamps;

plural metal clamp bolts having respective shanks extending through the clamps; and plural metal clamp nuts, each clamp nut being formed separately from the clamps, each clamp nut being engaged with a respective clamp bolt to thereby hold the drive cable securely between the clamps.

11. The apparatus of claim 8, wherein the reduction gear assembly includes:

plural vertically-oriented rotatable shafts, at least one of the shafts being an input shaft connected to the drive cable of the motor and including an input gear, at least one of the shafts being a worm shaft including the worm element, the worm element being coupled to the input gear; and a wormgear shaft attached to the worm gear and gearedly coupled to the first overrunning clutch.

12. The apparatus of claim 8, wherein the pedal shaft establishes plural pawls, and the second overrunning clutch includes:

a plunger block surrounding the pedal shaft; and plural plungers disposed in the plunger block for reciprocable motion in a radial dimension relative to the pedal shaft, each plunger being spring biased toward the pedal shaft for ratchetably engaging the pawls of the pedal shaft.

13. The apparatus of claim 12, in combination with the bicycle.

14. A bicycle, comprising:

a seat mounted on a frame;

pedals attached to a pedal shaft;

a chain ring;

a gasoline motor mounted behind the seat, the motor having a flexible drive cable extending forward toward the pedal shaft; and a clutch assembly interconnecting the drive cable of the motor, the pedal shaft, and the chain ring such that the chain ring is caused to rotate by engaging the motor, by pedalling the pedals, and by engaging the motor and pedalling the pedals simultaneously to thereby propel the bicycle.

15. The bicycle of claim 14, wherein the clutch assembly includes:

a reduction gear assembly coupled to the flexible drive cable;

a first overrunning clutch coupled to the reduction gear assembly;

a power sprocket coupled to the first overrunning clutch;

a power chain meshed with the power sprocket;

a second overrunning clutch coupling the pedal shaft to the chain ring; and an input sprocket coupled to the chain ring, the input sprocket being meshed with the power chain.

16. The bicycle of claim 15, wherein the motor includes a crankshaft, and the motor is mounted on the bicycle with the crankshaft oriented in a longitudinal dimension relative to the bicycle.

17. The bicycle of claim 15, wherein the frame includes at least one rear mounting ferrule and the motor includes a bell housing having at least a first motor fastener depending downwardly, and the bicycle further comprises:

at least one tube insert engaged with the fastener;

at least one vertically-oriented support tube defining a top segment, the tube insert being closely received in the top segment, the support tube also defining a bottom segment; and at least one frame adaptor engaged with the bottom segment and with the ferrule to thereby support the motor on the bicycle.

18. The bicycle of claim 17, wherein the bell housing includes:

a top drive cable clamp;

a bottom drive cable clamp, the flexible drive cable being held securely between the clamps;

plural metal clamp bolts having respective shanks extending through the clamps; and plural metal clamp nuts, each clamp nut being formed separately from the clamps, each clamp nut being engaged with a respective clamp bolt to thereby hold the flexible drive cable securely between the clamps.

19. The bicycle of claim 15, wherein the reduction gear assembly includes:

plural vertically-oriented rotatable shafts, at least one of the shafts being an input shaft connected to the flexible drive cable of the motor and including an input gear, at least one of the shafts being a worm shaft including a worm element coupled to the input gear;

a worm gear meshed with the worm element; and a wormgear shaft attached to the worm gear and gearedly coupled to the first overrunning clutch.

20. The bicycle of claim 15, wherein the pedal shaft establishes plural pawls, and the second overrunning clutch includes:

a plunger block surrounding the pedal shaft; and plural plungers disposed in the plunger block for reciprocable motion in a radial dimension relative to the pedal shaft, each plunger being spring biased toward the pedal shaft for ratchetably engaging the pawls of the pedal shaft.

* * * * *